United States Patent [19]
Hallal

[11] 3,985,463
[45] Oct. 12, 1976

[54] AUTOMATIC THREAD CUTTING DEVICE

[76] Inventor: Eugene A. Hallal, 94, rue des Rosiers, 93400 Saint-Ouen, France

[22] Filed: Mar. 10, 1975

[21] Appl. No.: 556,730

[52] U.S. Cl................................ 408/116; 408/135
[51] Int. Cl.².................... B23B 49/04; B23B 47/26
[58] Field of Search ........... 408/125, 116, 129, 135, 408/17

[56] References Cited
UNITED STATES PATENTS

| | | |
|---|---|---|
| 1,173,574 | 2/1916 | Hayden............................ 408/135 X |
| 1,946,523 | 2/1934 | Cramer........................... 408/129 X |

*Primary Examiner*—Travis S. McGehee

[57] ABSTRACT

Simultaneous rotation and feed or withdrawal movements are imparted to a shaft carrying a screw tapping element in an automatic thread cutting apparatus by a rack and pinion drive on which is mounted a ramp-shaped cam, the rack and pinion, through a gear train, effecting rotation of the shaft, and the cam through a lever linkage effecting feed or withdrawal of the shaft and tapping element.

6 Claims, 2 Drawing Figures

AUTOMATIC THREAD CUTTING DEVICE

BACKGROUND OF THE INVENTION

This invention relates to machine tools of the screw thread cutting type.

More specifically, the invention relates to an automatic thread cutting apparatus which allows the screw pitch to be set and adjusted while the screw thread is being cut thereby obtaining a high production rate.

A number of known apparatuses of this type use a press movement, i.e., a descending and reascending movement, to control the feed and the return stroke of the screw tap. This type of apparatus does not allow the screw pitch to be adjusted, the feed and recoil disturbances of the screw taps being compensated by a damping device including a spring located between the control of the motion of rotation and the feed control of the screw tap. This arrangement is not mechanical thus requiring experienced personnel specialized on this particular type of machine tool, the cutting speed being partially compensated by the waste of time and the numerous breakdowns of the screw taps during operation this further decreasing general efficiency.

SUMMARY OF THE INVENTION

The object of the present invention is to provide an apparatus which avoids prior known drawbacks in that it is possible to maintain a relatively high cutting speed and thus a relatively high output per hour, and to employ nonskilled personnel which results in a decrease of the cost of the operations.

The apparatus according to the invention provides a closed mechanical connection which allows accurate synchronism between the number of rotations of the screw tap and its feed into the workpiece to be threaded, in other words the ratio between the number of rotations of the screw, its feed in accordance with its pitch in its feed and recoil movements being accurately determined. Moreover, a single control of setting the pitch is sufficient for the initial setting up of the thread cutting machine.

According to the invention there is provided an automatic thread cutting apparatus for producing screw threads at high speed including means for producing reciprocating rotational movements and corresponding simultaneous feed and recoil movements of a shaft member adapted to carry a screw tapping element, and adjustment means for accurately adjusting the pitch and synchronising the number of revolutions with the feed and recoil movements of the shaft member, wherein the speed of rotation of the tapping element may be varied, its feed and recoil movement being proportional to the rotational speed, while all the obtained movements depend upon each other.

More specifically, the present invention provides an automatic thread cutting device for producing screw threads at high speed comprising means for producing reciprocating rotational movements and corresponding simultaneous feed and recoil movements of a shaft member adapted to carry a screw tapping element and adjustment means for accurately adjusting the pitch and synchronising the number of revolutions with the feed and recoil movements of the shaft member wherein the speed of rotation of the tapping element may be varied, its feed and recoil movement being proportional to the rotational speed, while all the obtained movements depend upon each other.

BRIEF DESCRIPTION OF THE DRAWINGS

The invention will now be described by way of example with reference to the accompanying drawings wherein.

DETAILED DESCRIPTION OF THE INVENTION

Figure 1:
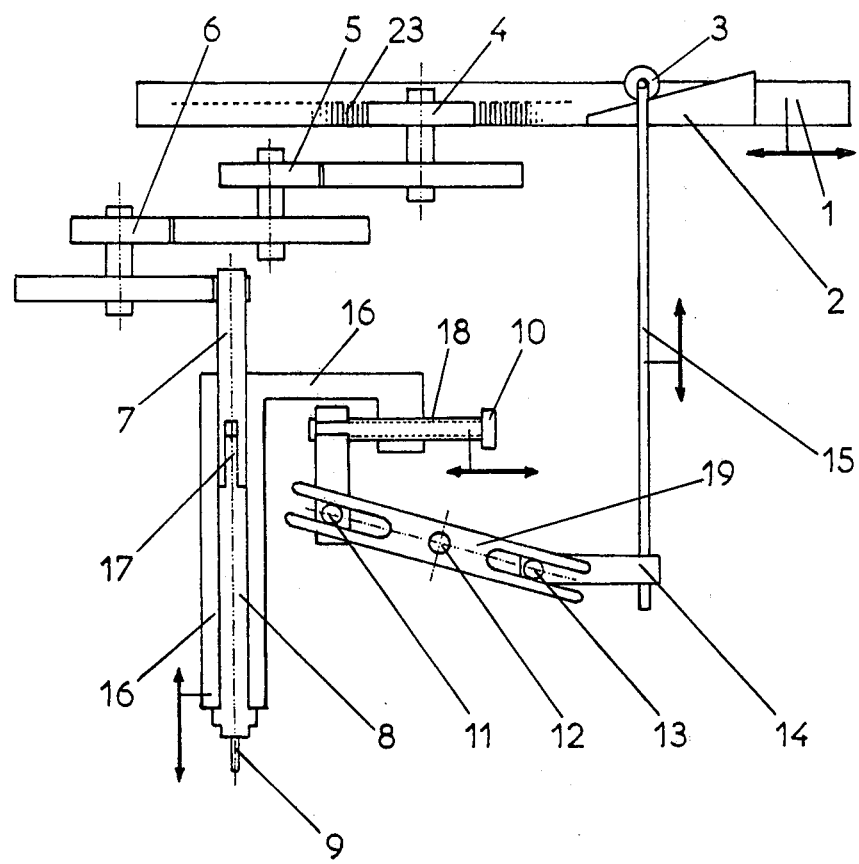
FIG. 1 is a diagrammatic illustration of the device of the invention.

As shown in FIG. 1, an automatic thread cutting apparatus includes a slide member 1 having a toothed portion 23. The slide member 1 effects a reciprocating motion by being actuated by a connecting rod or any other suitable means (not shown). The slide member 1 drives a transmission device in the form of a train of multiplying gears 4, 5 and 6 through the toothed portion 23 in two reverse movements of rotation, a shaft 7 at the end of the multiplying train of gears 4, 5 and 6 controlling the rotation of a screw tap 9 in both directions of rotation, one being the feed movement and the other the return. A cam device includes a ramp-shaped cam 2 on the slide member 1 for following the reciprocating movement thereof, the cam 2 controlling a roller 3, a control rod 15, a pin 13 and a connecting arm 14. The pin 13 follows all movements of the roller 3 with respect to the cam 2 and the slide member 1.

The pin 13 actuates a lever 19 causing the lever to rotate about a fixed axis 12. The lever 19 actuates a pin 11 and thus an assembly including a micrometer screw 18 with a head 10 as well as a bearing member 16 for the rotating shaft 8, which carries the screw tap or taps 9. The alternating movement of the tap carrying shaft 8 is assisted by the play of a slotted link 17 which is rotated by the shaft 7 driven by the gears 6, 5 and 4 which is in turn actuated by the straight toothed portion 23 of the slide member 1. A series of so-called "ring-like" elements is thus obtained in which a single movement is determined by the totality of the other movements of the mechanism, each of these other movements being mechanically dependent on each other.

The originality of the apparatus is to be found in that it is sufficient to change the length of the lever 19 by adjusting the micrometer screw 18 which controls the position of the pin 11, the change in position of the pin 11 altering the length of the lever between the pin 11 and the fixed axis 12, in order to have the extent of the descent (or feed) of shaft 8 coincide with the number of revolutions of the shaft 8. In other words, if the feed or recoil movement of shaft 8 is 1 millimeter during a total number of revolutions determined by an oscillation of the lever assembly 11, 12 and 13, which defines the threading length, the general movements being alternated upon reversing the direction either of the feed-recoil or of rotation. The screw tap 9 to the pitch of which the screw 18 is adjusted, then experiences a feed and recoil movement which is accurately adjusted to its pitch.

The total length of the stroke of the tap 9 during its reciprocating movement will then be determined by the cam 2. In this way, two mechanical movements strictly depending on each other allow the feed and recoil problems of the screw taps to be solved depending upon their pitch, the latter being set on a micrometric dial, the number of revolutions of the screw tap being fixed. The adjusting of the pitch setting of this tool results in a variation of its straight displacement stroke in an accurate manner. The initial rapid adjusting of the length of the straight displacement alternated in accordance with a predetermined pitch is thus carried out in the apparatus of the present invention which may employ either embossing taps or cutting tools, the latter allowing any mechanical workpiece to be threaded, the use of embossing taps being limited only to metals of small thickness such as sheet metals.

Figure 2:
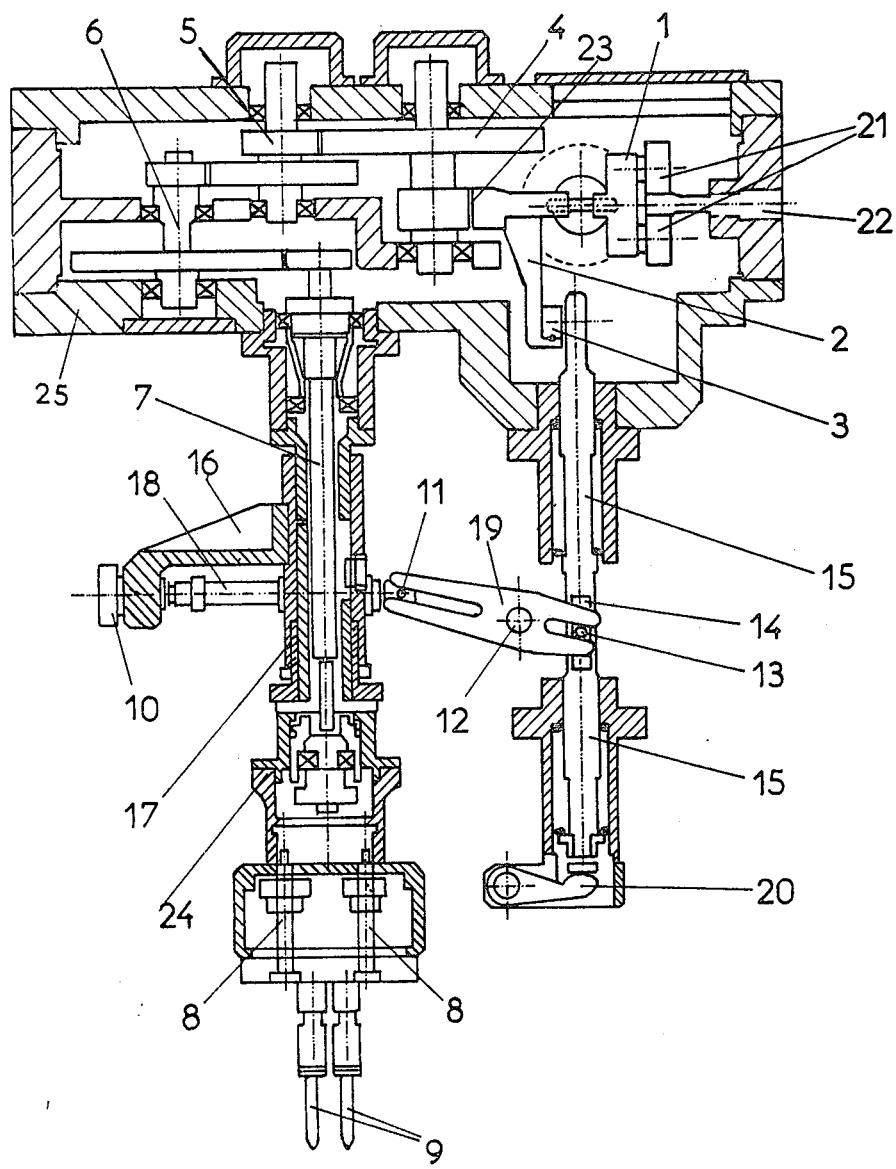
FIG. 2 is a simplified cross-sectional view of an embodiment of the automatic thread cutting device in accordance with the invention.

With reference to FIG. 2, which shows a simplified cross-sectional view of an industrial embodiment of the apparatus according to the present invention, the same reference numbers as in FIG. 1 have been used for a better understanding of the following description.

It should be noted that a slide member 1 is provided which is displaced on a longitudinal element 22 by means of roller-guides 21. The member 1 during its reciprocating movements drives the gear train causing the gears 4, 5 and 6 to rotate in alternate directions. The end gear 6 drives the shaft 7 which in turn actuates the tap-carrying assembly including elements 24 and 8 and the screw tap 9 (two taps are illustrated in FIG. 2 but they could be multiple). The assembly of elements 9, 8 and 24 may be vertically displaced up and down by means of the slotted link 17 which is mechanically connected to the bracket 16 carrying the micrometer screw 18 rigidly connected to the pin 11. The latter is caused to reciprocate by the lever 19 which is actuated by the pin 13 and arm 14 on the control rod 15, which is actuated by the roller 3, which, in turn, is controlled by the cam 2.

A manual control 20 is provided for the initial positioning of the screw taps in the direction of the axis of the recess to be threaded.

The gears 4, 5 and 6 and the shaft 7 have a light mass in order to operate at high speed, and because they undergo substantial acceleration and deceleration, such moving members are lubricated by oil contained in a basin 25.

The apparatus according to the invention may be employed in cases which demand a high rate of producing threads in mass production and substantial economy of employing unskilled personnel. The absence of tap breakings in the apparatus is also a major feature, the application being the adaptation of the apparatus to grinding and drilling machines.

I claim:
1. An automatic thread cutting apparatus for producing screw threads at high speed comprising a shaft member; a screw tapping element carried by said shaft member; slide means and a transmission device for effecting reciprocating rotational movement of said shaft member; and a cam device associated with said slide means for effecting feed and recoil movements of the shaft member corresponding to rotational movement of the shaft member; said cam device including adjustment means for adjusting the pitch of the screw tapping element, said cam device synchronising the rate of rotation of said shaft member with the feed and recoil movements thereof, whereby the rate of rotation of the tapping element may be varied, the feed and recoil movement of the tapping element being directly proportional to the rate of rotation thereof.

2. An apparatus according to claim 1, wherein said transmission and cam devices form a ring-like assembly including the shaft member, slide means, transmission device and cam device, the slide means being movable longitudinally to drive all elements of the assembly.

3. An apparatus according to claim 2, wherein said cam device includes a ramp-shaped cam on said slide means and a lever having one end connected to said cam and another end connected to said shaft member for effecting feed and recoil movements of said shaft member in response to movement of the slide member.

4. An apparatus according to claim 3, wherein said adjustment means includes a micrometer screw connected to said one end of the lever for accurately adjusting the pitch of the screw tapping element.

5. An apparatus according to claim 4, wherein said cam device includes a control rod connecting said one end of the lever to the ramp-shaped cam, and a bearing member connected to said shaft member and carrying said micrometer screw.

6. An apparatus according to claim 5, wherein said transmission device includes a gear train driven by said slide means and connected to said shaft member.

* * * * *